United States Patent [19]

Owatari

[11] 4,421,559
[45] Dec. 20, 1983

[54] JET PRINTING INK COMPOSITION

[75] Inventor: Akio Owatari, Shiojiri, Japan

[73] Assignee: Epson Corporation, Nagano, Japan

[21] Appl. No.: 315,129

[22] Filed: Oct. 26, 1981

[30] Foreign Application Priority Data

Oct. 27, 1980 [JP] Japan .............................. 55-150281

[51] Int. Cl.$^3$ .............................................. C09D 11/02
[52] U.S. Cl. ......................................... 106/20; 106/22
[58] Field of Search .................................... 106/20, 22

[56] References Cited

U.S. PATENT DOCUMENTS 3,246,997 4/1966 Sumner et al. ......................... 106/22
3,846,141 11/1974 Ostergren et al. .................... 106/31

*Primary Examiner*—Lorenzo B. Hayes
*Assistant Examiner*—Amelia B. Yarbrough
*Attorney, Agent, or Firm*—Blum, Kaplan, Friedman, Silberman and Beran

[57] ABSTRACT

An aqueous fluid ink particularly well suited for use in an ink jet printer is provided. The aqueous fluid ink compositions include a humectant in combination with urea for efficiently lowering the freezing point without a significant increase in viscosity. Aqueous fluid ink compositions prepared in accordance with the invention include at least one humectant selected from the group consisting of aliphatic polyhydric alcohols, alkyl ether derivatives of the aliphatic polyhydric alcohols and acetate ester derivatives of the aliphatic polyhydric alcohols, urea, a water-soluble dye and water. Viscosity is maintained between about 2 and 3 centipoises at 20° C. and a quick drying ink is provided by adjusting the pH to between about 12 and 13.5.

7 Claims, No Drawings

JET PRINTING INK COMPOSITION

BACKGROUND OF THE INVENTION

This invention relates to an improved fluid ink, and more particularly to improved aqueous fluid ink compositions. Compositions prepared in accordance with preferred embodiments of the invention have lowered freezing points and are particularly well suited for use in printers, such as, an ink jet printer.

Many printers utilize fluid inks, such as an ink jet printer and a wire dot-type printer. In the ink jet printing process, printed dots are formed on a print medium by application of fine ink droplets in a desired pattern in accordance with a non-impact procedure. The wire-dot type ink printer is one wherein a fluid ink is placed on the tip of a wire and printing is performed in accordance with an impact procedure.

Since these types of printers utilize a fluid ink, they cannot function at temperatures lower than the freezing point of the fluid ink. For example, the printing operation cannot be utilized because the fluid ink freezes at low temperatures. Once freezing occurs, various problems arise in addition to the inability to print. The fluid ink is usually composed of several components, which when re-liquified after freezing, readily separate into these individual components. After re-liquification, it is necessary to remix the separated fluid ink by application of stirring or heat and stirring. In the case of an ink jet printer, the ink jet printing head may be damaged due to expansion of the fluid ink resulting from the freezing. In addition, freezing and re-liquification may cause formation or introduction of air bubbles into the fluid ink. This prevents sufficient pressure from forming in the pressure-application chamber for forming the fluid ink into the fine droplets required. Thus, it is impossible to perform printing of acceptable quality after the ink has frozen.

In order to avoid these problems, it is desirable to provide a fluid ink for use in printers which will not freeze at the temperatures at which the printer is operated. In addition to overcoming this freezing problem, it is necessary to maintain the ink at a low viscosity. Fluid inks for printers, particularly those for ink jet printers are aqueous inks having low viscosity and high surface tension which permit easily handling. These aqueous inks, however, have freezing points which are not much lower than that of water. For example, an aqueous ink having a viscosity of 2 centipoises, or less, at 20° C. freezes at a temperature of −5° C.

In view of these relatively high freezing points, many conventional aqueous inks, therefore, are not suitable for use at low temperatures. In order to prevent these inks from freezing by heating and/or insulating, for example, the printer must include a heat-insulation apparatus. This gives rise to the disadvantage that additional energy is required for such a heat source. Operation of a heater results in an increase in the amount of electricity to be consummed. Additionally, this additional element increases the production cost and size of the printer.

Oil based inks which are made up of organic solvents having low freezing points are also useful in the printers. These oil based inks; however, suffer from the disadvantage of small contact angles between most organic solvents and the recording medium. In view of this, the organic solvents penetrates unequally through the recording medium making it difficult to form fully satisfactory printing dots. Thus, the quality of the print letters formed using such an oil base ink is inferior to that of the letter formed from aqueous inks.

In general, aqueous inks suitable for use in an ink jet printer include principally water, a dye as the recording medium, and a humectant to prevent deposition of the dye due to evaporation of water. By increasing the amount of humectant, without addition of additional components, it is possible to lower the freezing point of the ink to much lower levels than that of water. For example, when glycerol is utilized as the humectant, a 20% by weight aqueous solution of glycerol has a freezing point of −5° C., and a 40% by weight aqueous solution of glycerol has a freezing point of −15° C. On the other hand, the viscosity of the 20% by weight solution is 1.8 centipoises, but the viscosity of the latter aqueous solution is increased to about 3.8 centipoises. Such increase in viscosity of the ink lengthens the time required for the meniscus of ink to return to the original level in an ink jet printer nozzle during formation of ink droplets. Therefore, it is not possible to increase the frequency of response of the recording head to a desired level. This leads to the disadvantage that the printing speed cannot be increased.

When attempting to lower the freezing point of a water-humectant-based printing ink, for example, containing no additional components and maintain the viscosity between the range of about 2 to 3 centipoises at 20° C., it has not been possible to lower the freezing point to levels lower than about −15° C. This is the case even by using a humectant capable of effectively lowering the freezing point, such as ethylene glycol. Accordingly, it would be desirable to provide a composition for a fluid ink wherein the freezing point could be lowered while maintaining the viscosity within the range of about 2 to 3 centipoises at 20° C.

SUMMARY OF THE INVENTION

Generally speaking, in accordance with the invention, a fluid ink for a printer having a freezing point lower than a water-humectant system is provided. The fluid inks prepared in accordance with the invention are aqueous fluid ink compositions including a humectant and urea for use in printers. The composition includes at least one humectant selected from the group consisting of aliphatic polyhydric alcohols, alkyl ether derivatives of the aliphatic polyhydric alcohols, and acetate ester derivatives of the aliphatic polyhydric alcohols, the urea, a water-soluble dye and water.

The aqueous fluid inks prepared in accordance with the preferred embodiments of the invention comprise per 100 parts by weight of the ink composition, from about 5 to 35 parts by weight of at least one humectant selected from the group consisting of diethylene glycol, triethylene glycol, tetraethylene glycol, propylene glycol polyethylene glycol and glycerol; from about 10 to 40 parts by weight of ethylene glycol; from 1 to 20 parts by weight urea; about 10 parts by weight or less of a water-soluble dye; and the remainder being substantially water. The fluid inks prepared in accordance with this composition have a reduced freezing point and a viscosity within the range of about 2 to 3 centipoises at 20° C., making the ink particularly well suited for use in an ink jet printer.

Accordingly, it is an object of the invention to provide an improved aqueous ink.

Another object of the invention is to provide a fluid ink for use in printers which will not freeze at temperatures at which the printer is intended to be used.

A further object of the invention is to provide an aqueous ink for use in printers which has a lowered freezing point.

Yet another object of the invention is to provide an improved aqueous ink for use in printers having a reduced freezing point and a viscosity in the range of 2 to 3 centipoises at 20° C.

Yet a further object of the invention is to provide an improved aqueous ink for use in printers based on a water-humectant system by the addition of urea for efficiently lowering the freezing point.

Yet another object of the invention is to provide an improved aqueous ink composition comprising a humectant, urea, a water-soluble dye and water.

Yet a further object of the invention is to provide an improved aqueous ink composition for use in printers wherein the freezing point of the ink is lowered by the use of a combination of urea and a humectant.

Another object of the invention is to provide an improved aqueous ink for use in printers wherein the freezing point is lowered by a combination of urea and a humectant and the viscosity is maintained between about 2 to 3 centipoises at 20° C. which is particularly well suited for use in an ink jet printer.

Still other objects and advantages of the invention will in part be obvious and will in part be apparent from the specification.

The invention accordingly comprises the several steps and the relation of one or more of such steps with respect to each of the others, and the composition possessing the features, properties, and the relation of components, which are exemplified in the following detailed disclosure, and the scope of the invention will be indicated in the claims.

DESCRIPTION OF THE PREFERRED EMBODIMENTS

Aqueous fluid ink compositions for use in printers prepared in accordance with the invention are based on water-humectant system including urea which effectively lowers the freezing point of the composition without increasing the viscosity. These aqueous fluid ink compositions include at least one humectant selected from the group consisting of aliphatic polyhydric alcohols, alkyl ether derivatives of the aliphatic polyhydric alcohols, and acetate ester derivatives of the aliphatic polyhydric alcohols, urea, a water-soluble dye and water. More particularly, in accordance with a preferred embodiment of the inventon, ethylene glycol is used as a freezing point depressant together with a humectant having the effect of preventing clogging, such as, triethylene glycol, and/or glycerol. In these cases the aqueous fluid inks include per 100 parts by weight of total composition, from about 5 to 35 parts by weight at least one humectant is selected from the group consisting of diethylene glycol, triethylene glycol, tetraethylene glycol, propylene glycol, polyethylene glycol and glycerol; from about 10 to 40 parts by weight ethylene glycol; from about 1 to 20 parts by weight of urea; about 10 parts by weight or less of a water-soluble dye, and the remainder being substantially water.

In accordance with the invention, fluid ink compositions having desired freezing points can be obtained by controlling the type of humectant, and the amounts of urea and the humectant added to the composition. This selection is made so that the performance of the ink for use in an ink jet printer does not deterioate, particularly so that the nozzle of the head of the printer will not clog.

The humectant used in the compositions of the invention acts as a freezing point-lowering agent in combination with the urea. This combination also prevents precipitation of the dye due to the evaporation of water from the ink, thereby further preventing clogging of the printer nozzle. The preferred humectants are those which have high solubility in water, water-absorbing properties, low vapor pressure, excellent dye-dissolving properties and also lower the freezing point of an aqueous solution Such preferred humectants include, aliphatic polyhydric alcohols, alkyl ether derivatives of the aliphatic polyhydric alcohols and acetate ester derivatives of the aliphatic polyhydric alcohols. Specific examples include, polyhydric alcohols, such as ethylene glycol, diethylene glycol, triethylene glycol, tetraethylene glycol, polyethylene glycol and glycerol; the alkyl ether derivatives of the polyhydric alcohols include for example, ethylene glycol monomethyl ether, ethylene glycol monoethyl ether, diethylene glycol monoethyl ether, diethylene glycol monobutyl ether, diethylene glycol dimethyl ether, diethylene glycol methylethyl ether and triethylene glycol monomethyl ether; and the acetate ester derivatives of the polyhydric alcohols, include ethylene glycol monomethyl ether acetate, diethylene glycol monoethyl ether acetate, glyceryl monoacetate and glyceryl diacetate.

Of the preferred humectants, ethylene glycol is particularly well suited as a freezing point-lowering agent. The diethylene glycol, triethylene glycol, tetraethylene glycol, propylene glycol, polyethylene glycol, glycerol and the like, have low vapor pressures and excellent dye-dissolving properties.

In order to examine the freezing point-lowering effect of the humectant and urea combinations, four aqueous solutions were prepared as follows. For each 100 parts by weight of an aqueous solution, 10 parts by weight of glycerol, 20 parts by weight of ethylene glycol and 70 parts by weight of water were included. Urea was added in amounts of 0 weight percent 1% by weight, 5% by weight and 10% by weight, respectively, based on the total weight of glycerol, ethylene glycol and water and the freezing points of the compositions were measured. It was found that the aqueous solution without urea froze at −10° C., the aqueous solution containing 1% by weight urea and 5% by weight urea froze at −15° C., but the aqueous solution containing 10% by weight urea did not freeze at temperatures of −20° C.

The humectant content of the fluid ink prepared in accordance with the invention is a major factor determining the viscosity of the fluid ink. It is therefore undesirable to increase the amount of humectant too much, because it results in an undesirable increase in the viscosity of the fluid ink. It has been confirmed that an increase in the viscosity of the fluid ink results in a decrease in the frequency of response of an ink jet-recording head which results in an increase in the required driving voltage. It is preferred, therefore, to add humectant in an amount ranging from about 5 to 35 parts per 100 parts by weight of the total composition of the fluid ink. Addition of humectant within this range permits control of the viscosity of the resulting fluid ink within the range of about 1.5 to 19 centipoises at 20° C.

The amount of urea added to the composition can be varied within a wide range, depending upon the desired freezing point and the type and amount of the other humectant component. However, if the amount of urea added is extremely small, the freezing point is not significantly lowered, whereas if it is a large amount is added, clogging may occur due to precipitation of urea from solution. Therefore, it has been found that a suitable amount of urea is from about 1 to 20 parts by weight, per 100 parts by weight of the total fluid ink composition.

In accordance with the preferred embodiments of the invention, ethylene glycol, which has excellent freezing point lowering effects, is used in combination with the urea. When ethylene glycol is added in an amount of from about 10 to 40 parts by weight, it is preferred that the fluid ink of the composition also contain from about 5 to 35 parts by weight of a humectant which has the effect of preventing clogging, for example triethylene glycol, polyethylene glycol and/or glycerol, and from about 1 to 20 parts by weight of urea. All parts are based on a per 100 parts by weight of the fluid ink bases.

The dye used as a recording medium in the fluid inks prepared in accordance with the invention is preferably a water-soluble direct dye or a dispersion dye in order to increase the water-proofness and light fastness of the printed matter. In addition, dyes having high solubility and dispersibility in water and a humectant are preferred because they rarely cause clogging of the nozzle orifice due to precipitation from solution. Examples of such preferred dyes are Kayaku Direct Deep Black XA, Kayaku Direct Special Black AXN, Kayaset Black 009A, Kayaset Black 010, Kayaset Black 021, Kayaset Violet 001, Kayaset Blue 005, Kayarus Turquoise Blue GL and Kayaset Red 006, which are trademarks for dyes produced by Nippon Kayaku Co., Ltd., in Japan and Sumilight Supra Scarlet BNS concentrate, Nippon Fast Scarlet GSX, and Sumilight Violet BB concentrate, which are trademarks of dyes produced by Sumitomo Chemical Industry Co., Ltd. in Japan. The amount of the dye added to the composition is preferably about 10 parts by weight, or less per 100 parts by weight of the fluid ink. Greater amounts of dye than 10 parts by weight per 100 parts by weight of ink readily cause clogging of a nozzle orifice.

In order to provide a quick-dry ink, the pH of the fluid ink prepared in accordance with the invention may be adjusted to about 12 to 13.5. Preferred adjustors are strong basic substances, such as metallic hydroxides, for example sodium hydroxide, potassium hydroxide and lithium hydroxide. These alkali metal hydroxides are preferred because they provide high alkalinity by addition of small amounts. Furthermore, in order to inhibit the growth of bacteria and mold for permitting storage of the fluid ink for extended periods of time, preservatives, such as dioxin(6-acetoxy-2,4-dimethyl-m-dioxane) and sodium dehydroacetic acid, may also be added to the compositions.

The fluid ink compositions prepared in accordance with the invention wherein urea is included, have markedly lower freezing points compared with inks of similar compositions which do not contain urea. Additionally, the freezing point of the fluid ink can be adjusted by controlling the amount of urea added. The addition of urea permits preparation of fluid inks suitable for use under various operating conditions with almost no increase in viscosity. Accordingly, with fluid inks prepared in accordance with the invention, printing can be performed under various operating conditions. Furthermore, these fluid inks have the advantage that they rarely cause clogging of the print head nozzle and can be handled with ease because it is an aqueous based ink.

The following examples were performed in order to illustrate preparation and printing of ink compositions in accordance with the invention in greater detail. These examples are not presented in a limiting sense. All parts by weight set forth are parts per 100 parts by weight of the total fluid ink composition, unless otherwise indicated.

EXAMPLE 1

A mixture of 615 g of distilled water, 80 g of glycerol and 280 g of ethylene glycol was placed in a 2-liter beaker equipped with a stirrer and was stirred until fully mixed. Then, 10 g of urea was added to the resulting mixture. After confirming that urea was dissolved, 15 g of Kayaku Direct Special Black AXN was slowly added to the mixture. The resultant mixture was then stirred for an additional 6 hours while maintaining the temperature at 60° C. After being cooled to room temperature, the mixture was filtered with a 10 μm millipore membrane filtered (produced by the Millipore Corp.) and followed by filtration with a 1 μm millipore membrane filter.

The composition of the prepared ink was as follows:

| Component | Parts by Weight |
| --- | --- |
| Kayaku Direct Special Black AXN | 1.5 |
| Glycerol | 8 |
| Ethylene glycol | 28 |
| Urea | 1 |
| Distilled water | 61.5 |

The ink composition of Example 1 had a viscosity of 3.1 centipoises at 20° C. and a pH of 9.4 at 20° C. The freezing point of the ink was measured by placing it in a low temperature thermostat chamber and visably observed to be −24° C. For comparison, an ink composition was prepared having the same composition at above, except that the urea was omitted. This latter ink without the urea was completely frozen at −20° C.

The ink composition prepared in accordance with this Example 1 was charged into a multi-head ink jet printer having a nozzle orifice diameter of 40 μm and ink jet printing was performed at −20° C. Sharp black printed dots of high printing quality were obtained.

EXAMPLE 2

An ink having the following composition was prepared following the procedures of Example 1:

| Component | Parts by Weight |
| --- | --- |
| Kayaset Black 021 | 0.8 |
| Glycerol | 13 |
| Ethylene glycol | 20 |
| Potassium hydroxide | 0.4 |
| Urea | 3 |
| Distilled water | 62.8 |

The ink composition of Example 2 had a viscosity of 2.9 centipoises at 20° C., a pH of 12.4 at 20° C., and a freezing point of −18° C. A comparative ink composition without urea was frozen at −12° C.

EXAMPLE 3

An ink having the following composition was prepared following the procedures of Example 1:

| Component | Parts by Weight |
|---|---|
| Kayaset Blue 005 | 1 |
| Triethylene glycol | 10 |
| Ethylene glycol | 20 |
| Urea | 5 |
| Distilled water | 64 |

The ink composition of Example 3 had a viscosity of 2.7 centipoises at 20° C., a pH of 7.5 at 20° C., and a freezing point of −15° C. A comparative ink composition without urea was frozen at −9° C.

EXAMPLE 4

An ink having the following composition was prepared following the procedures of Example 1:

| Component | Parts by Weight |
|---|---|
| Sumilight Supra Scarlet BNS conc. | 1 |
| Diethylene glycol | 10 |
| Ethylene glycol | 25 |
| Sodium hydroxide | 0.5 |
| Urea | 1 |
| Distilled water | 62.5 |

The ink composition of Example 4 had a viscosity of 3.2 centipoises at 20° C., a pH of 12.5 at 20° C., and a freezing point of −22° C. A comparative ink composition without urea froze at −13° C.

EXAMPLE 5

An ink having the following compositions was prepared following the procedures of Example 1:

| Component | Parts by Weight |
|---|---|
| Kayaset Black 021 | 0.8 |
| Glycerol | 10 |
| Ethylene glycol | 20 |
| Potassium hydroxide | 0.4 |
| Urea | 10 |
| Distilled water | 58.8 |

The ink composition of Example 5 had a viscosity of 2.9 centipoises at 20° C., a pH of 12.3 at 20° C., and a freezing point of −22° C. A comparative ink composition without urea froze at −10° C.

The inks prepared in Examples 1 to 5 were each charged into a multihead (nozzle orifice diameter 40 μm), and jet printing was performed at various temperatures ranging between −10° C. and 60° C. The printing was carried out smoothly, and the density and quality of printed letters were excellent. The inks prepared in Examples 2, 4 and 5 in which the pH was controlled to 12.0 to 13.5 had quick-drying properties after printing.

In order to examine the clogging of the nozzle orifice, jet blast printing was continued for 1 hour and then was allowed to stand for 144 hours with the nozzle orifice opened in the atmosphere. At the end of the time, re-jetting was conducted. With all of the inks prepared in accordance with the invention as set forth in the foregoing examples, clogging did not occur and the re-jetting could be performed smoothly.

It will thus be seen that the objects set forth above, among those made apparent from the preceding description, are efficiently attained and, since certain changes may be made in carrying out the above process and in the composition set forth without departing from the spirit and scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Particularly it is to be understood that in said claims, ingredients or compounds recited in the singular are intended to include compatible mixtures of such ingredients wherever the sense permits.

What is claimed is:

1. A jet printing ink composition comprising:
   at least one humectant selected from the group consisting of diethylene glycol, triethylene glycol, tetraethylene glycol, polyethylene glycol, glycerol and mixtures thereof;
   a freezing point lowering agent including urea and ethylene glycol;
   a water-soluble dye; and
   water.

2. The jet printing ink composition of claim 1, wherein the composition includes from about 10 to 40 parts by weight of the ethylene glycol, from about 5 to 35 parts by weight of the humectant, from about 1 to 20 parts by weight urea, about 10 parts by weight, or less of the water-soluble dye and the remainder being substantially water.

3. The aqueous fluid ink composition of claim 1, wherein the pH of the ink is adjusted from about 12 to 13.5.

4. The aqueous fluid ink composition of claim 3, wherein the pH is adjusted by including at least one alkali metal hydroxide selected from the group consisting of sodium hydroxide, potassium hydroxide, lithium hydroxide and mixtures thereof in the composition.

5. The aqueous fluid ink composition of claim 2, further including a water-soluble antioxidant to inhibit the growth of bacteria and mold.

6. The aqueous fluid ink composition of claim 5, wherein the antioxidant is selected from the group consisting of dioxin and sodium dehydroacetic acid.

7. The jet printing composition of claim 1, wherein the viscosity of the ink is adjusted about 3 centipoise at 20° and the freezing point of the ink is adjusted about −20° C.

* * * * *